United States Patent
Zhang et al.

(10) Patent No.: US 9,729,849 B2
(45) Date of Patent: Aug. 8, 2017

(54) 3D VIDEO CODING INCLUDING DEPTH BASED DISPARITY VECTOR CALIBRATION

(75) Inventors: Wenhao Zhang, Beijing (CN); Yi-Jen Chiu, San Jose, CA (US); Lidong Xu, Beijing (CN); Yu Han, Beijing (CN); Zhipin Deng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 13/977,331

(22) PCT Filed: Apr. 19, 2012

(86) PCT No.: PCT/US2012/034177
§ 371 (c)(1),
(2), (4) Date: Oct. 11, 2013

(87) PCT Pub. No.: WO2013/158097
PCT Pub. Date: Oct. 24, 2013

(65) Prior Publication Data
US 2014/0153645 A1    Jun. 5, 2014

(51) Int. Cl.
*H04N 13/00* (2006.01)
*H04N 19/597* (2014.01)
*H04N 19/513* (2014.01)

(52) U.S. Cl.
CPC ....... *H04N 13/0048* (2013.01); *H04N 19/513* (2014.11); *H04N 19/597* (2014.11)

(58) Field of Classification Search
CPC . H04N 13/0048; H04N 19/513; H04N 19/597
USPC ....................................... 375/240.12, 240.16
See application file for complete search history.

(56) References Cited

U.S. PATENT DOCUMENTS

| | | | |
|---|---|---|---|
| 8,594,193 B2 | 11/2013 | He et al. | |
| 2006/0013320 A1* | 1/2006 | Oguz | H04N 19/61 375/240.27 |
| 2007/0075997 A1 | 4/2007 | Rohaly et al. | |
| 2008/0198924 A1* | 8/2008 | Ho | H04N 19/597 375/240.01 |
| 2009/0207235 A1 | 8/2009 | Francini et al. | |
| 2010/0053416 A1 | 3/2010 | Chen et al. | |
| 2011/0044550 A1* | 2/2011 | Tian | H04N 19/597 382/238 |
| 2011/0050853 A1 | 3/2011 | Zhang et al. | |
| 2011/0069064 A1 | 3/2011 | Zhang et al. | |

(Continued)

FOREIGN PATENT DOCUMENTS

| | | |
|---|---|---|
| CN | 101056398 A | 10/2007 |
| KR | 2011-0006696 | 1/2011 |

(Continued)

OTHER PUBLICATIONS

Mancini et al. "Robust quadtree-based disparity estimation for the reconstruction of intermediate stereoscopic images", 1998 SPIE.*

(Continued)

*Primary Examiner* — William C Vaughn, Jr.
*Assistant Examiner* — Naod Belai
(74) *Attorney, Agent, or Firm* — Green, Howard & Mughal LLP.

(57) ABSTRACT

Systems, apparatus, articles, and methods are described including operations for 3D video coding including depth based disparity vector calibration.

20 Claims, 7 Drawing Sheets

(56) References Cited

U.S. PATENT DOCUMENTS

| | | | |
|---|---|---|---|
| 2011/0123113 A1 | 5/2011 | Berretty et al. | |
| 2014/0341289 A1* | 11/2014 | Schwarz | H04N 19/597 375/240.16 |
| 2014/0341291 A1* | 11/2014 | Schwarz | H04N 19/597 375/240.16 |

FOREIGN PATENT DOCUMENTS

| | | |
|---|---|---|
| KR | 2011-0019644 | 2/2011 |
| KR | 1020110036234 A | 4/2011 |
| TW | 201306561 | 2/2013 |
| WO | 2008091117 A1 | 7/2008 |
| WO | 2009013682 A2 | 1/2009 |
| WO | 2013/158097 A1 | 10/2013 |

OTHER PUBLICATIONS

Office Action mailed Aug. 21, 2015 for Korean Patent Appln. No. 2014-7027039.

Notice of Grant mailed Oct. 28, 2015 for Taiwan Patent Appln. No. 102113500.

Office Action for Taiwanese Patent Application No. 102113500 issued on Jun. 3, 2015.

International Preliminary Report on Patentability received for PCT Patent Application No. PCT/US2012/034177, mailed on Oct. 30, 2014, 5 pages.

Notice of Allowance mailed Jan. 29, 2016 for Korean Patent Appln. No. 2014-7027039.

Extended Search Report for European Patent Application No. 12874667.4 issued on Dec. 7, 2015.

Office Action for EP Patent Application No. 12874667.4, issued on Nov. 7, 2016.

Office Action for Taiwan Patent Application No. 103146299, mailed on Oct. 4, 2016.

International Search Report and Written opinion received for PCT Patent Application No. PCT/US2012/034177 mailed on Dec. 27, 2012, 8 pages.

Office Action for EP Patent Application No. 12874667.4, dated May 26, 2017.

* cited by examiner

3D VIDEO CODING INCLUDING DEPTH BASED DISPARITY VECTOR CALIBRATION

BACKGROUND

A video encoder compresses video information so that more information can be sent over a given bandwidth. The compressed signal may then be transmitted to a receiver that decodes or decompresses the signal prior to display.

3D Video Coding (3DVC) refers to a new video compression standard that targets serving a variety of 3D displays. 3DVC is under development by the ISO/IEC Moving Picture Experts Group (MPEG). At present, 3DVC is built based on the latest conventional video coding standard, High Efficiency Video Coding (HEVC), which is planned to be finalized by the end 2012.

The Multiview Video plus Depth (MVD) concept is often used to represent the 3D video content, in which a number of views and associated depth maps are typically coded and multiplexed into a bitstream. Camera parameters of each view are also typically packed into the bitstream for the purpose of view synthesis. One of the views, which is also typically referred to as the base view or the independent view, is typically coded independently of the other views. For the dependent views, video and depth can be predicted from the pictures of other views or previously coded pictures in the same view. According to the specific application, sub-bitstreams can be extracted at the decoder side by discarding non-required bitstream packets.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
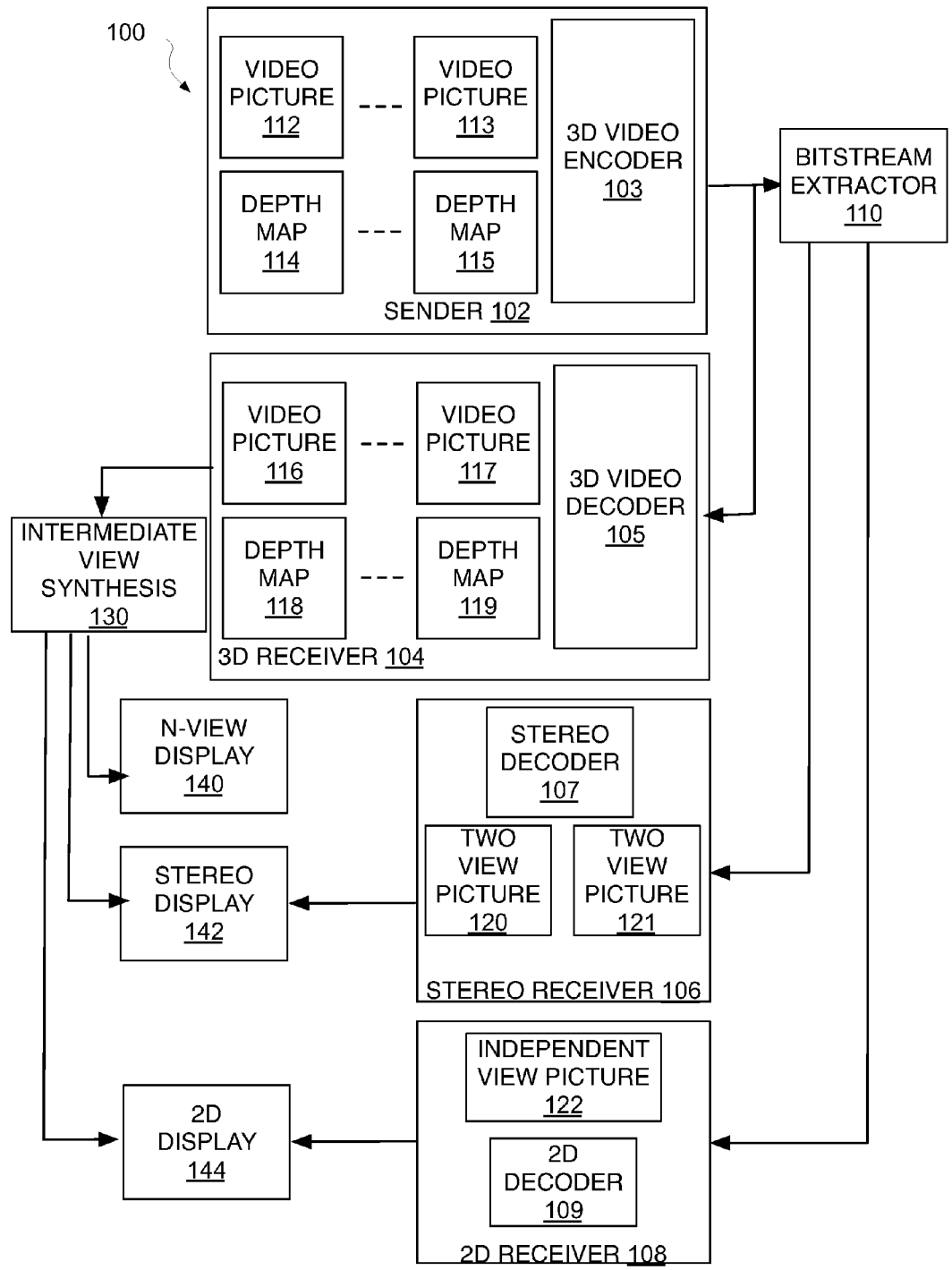
FIG. 1 is an illustrative diagram of an example 3D video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for 3D video coding including depth based disparity vector calibration.

As described above, in some cases, conventional video encoding algorithms result in losses. That is, in the course of compressing the video information, some information may be lost, resulting in decreased picture quality. Ideally, the video quality is improved to the greatest possible extent and the compression is increased to the greatest possible extent. However, these two goals tend to conflict with one another.

As will be described in greater detail below, operations for 3D video coding may utilize depth based disparity vector calibration techniques. For example, depth based disparity vector calibration techniques may be utilized for 3DVC.

One inter-view coding tool for coding dependent views is disparity-compensated prediction (DCP), which may be added as an alternative to motion-compensated prediction (MCP). MCP may refer to an inter picture prediction that uses already coded pictures of the same view, while DCP may refer to an inter picture prediction that uses already coded pictures of other views.

A depth based disparity vector calibration module may be inserted before the compensation in the decoding (or encoding) process of inter predicted Prediction Unit (PU). When the PU is disparity-compensated, a disparity vector value can be transmitted by the bitstream or derived using some primary disparity vector prediction scheme. All the pixels belonging to the PU may use the same primary disparity vector value to generate the prediction pixels from the reference view picture. If the depth based disparity vector calibration is applied, the disparity vector value may be refined for different region in the PU based on the corresponding depth map value.

FIG. 1 is an illustrative diagram of an example 3D video coding system 100, arranged in accordance with at least some implementations of the present disclosure. In the illustrated implementation. 3D video coding system 100 may include one or more types of displays (e.g., an N-view display 140, a stereo display 142, a 2D display 144, or the like), one or more imaging devices (not shown), a 3D video encoder 103, a 3D video decoder 105, a stereo video decoder 107, a 2D video decoder 109, and/or a bitstream extractor 110.

In some examples, 3D video coding system 100 may include additional items that have not been shown in FIG. 1 for the sake of clarity. For example, 3D video coding system 100 may include a processor, a radio frequency-type (RF) transceiver, and/or an antenna. Further, 3D video coding system 100 may include additional items such as a speaker, a microphone, an accelerometer, memory, a router, network interface logic, etc. that have not been shown in FIG. 1 for the sake of clarity.

As used herein, the term "coder" may refer to an encoder and/or a decoder. Similarly, as used herein, the term "coding" may refer to encoding via an encoder and/or decoding via a decoder. For example 3D video encoder 103 and 3D video decoder 105 may both be examples of coders capable of 3D coding.

In some examples, a sender 102 may receive multiple views from multiple imaging devices (not shown). The input signal for 3D encoder 103 may include multiple views (e.g., video pictures 112 and 113), associated depth maps (e.g., depth maps 114 and 115), and corresponding camera parameters (not shown). However, 3D video coding system 100 can also be operated without depth data. The input component signals are coded into a bitstream using 3D video encoder 103, in which the base view may be coded using a 2D video encoder, e.g. H264/AVC encoder or High Efficiency Video Coding (HEVC) encoder. If the bitstream from bitstream extractor 110 is decoded by a 3D receiver 104 using 3D video decoder 105, videos (e.g., video pictures 116 and 117), depth data (e.g., depth maps 118 and 119), and/or camera parameters (not shown) may be reconstructed with the given fidelity.

In other examples, if the bitstream from bitstream extractor 110 is decoded by a stereo receiver 106 for displaying the 3D video on an auto stereoscopic display (e.g., stereo display 142), additional intermediate views (e.g., two view pictures 120 and 121) may be generated by a depth-image-based rendering (DIBR) algorithm using the reconstructed views and depth data. If 3D video decoder 103 is connected to a conventional stereo display (e.g., stereo display 142), intermediate view synthesis 130 may also generate a pair of stereo views, in case such a pair is not actually present in the bitstream from bitstream extractor 110.

In further examples, if the bitstream from bitstream extractor 110 is decoded by a 2D receiver 108, one of the decoded views (e.g., independent view picture 122) or an intermediate view at an arbitrary virtual camera position can also be used for displaying a single view on a conventional 2D display (e.g., 2D display 144).

In operation, 3D video coding system 100 may implement operations for 3D video coding including depth based disparity vector calibration. As will be described in greater detail below, such depth based disparity vector calibration may apply to the problem of video compression. In 3D video compression coding, multiple views and associated depth maps may be coded in a bitstream to support various 3D video applications. Inter-view prediction technologies may be used to remove the redundancy between different views, in which the disparity-compensation based inter-view prediction may be added as an alternative to a motion-compensated prediction. Video contents belonging to different depth level typically behave differently when the disparity is estimated and used for compensation. Accordingly, such depth based disparity vector calibration may utilize a disparity-compensated block that may be divided into sub-blocks, where a characteristic depth value may be derived for each sub-block. After that, the disparity vector of each sub-block may be modified by using a pre-defined depth model. Accordingly, such depth based disparity vector calibration may improve the coding efficiency and flexibility of 3D video coding.

As will be discussed in greater detail below, 3D video coding system 100 may be used to perform some or all of the various functions discussed below in connection with FIGS. 2 and/or 3.

Figure 2:
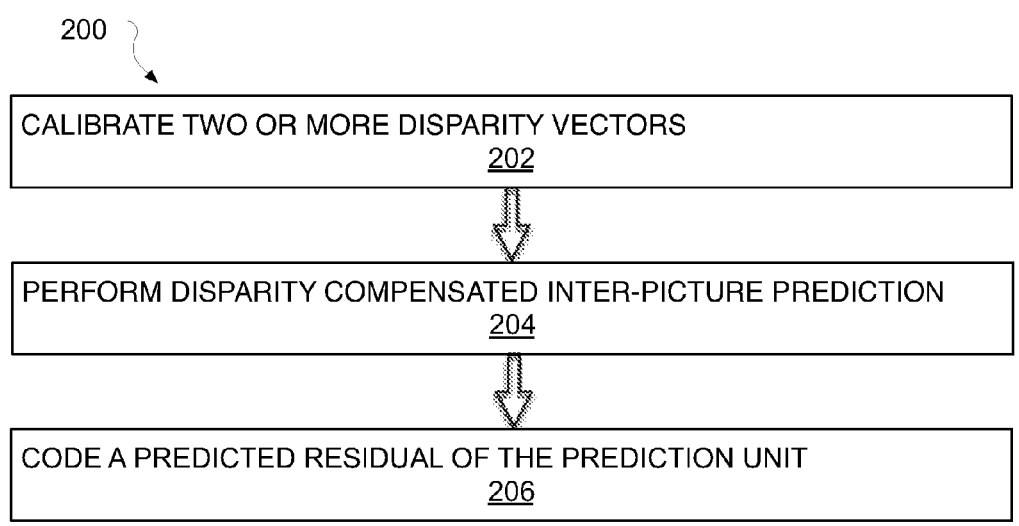
FIG. 2 is a flow chart illustrating an example 3D video coding process.

FIG. 2 is a flow chart illustrating an example 3D video coding process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example 3D video coding system 100 of FIGS. 1 and/or 5.

Process 200 may be utilized as a computer-implemented method for content aware selective adjusting of motion estimation. Process 200 may begin at block 202, "CALIBRATE TWO OR MORE DISPARITY VECTORS", where two or more disparity vectors may be calibrated. For example, two or more disparity vectors associated with a prediction unit may be calibrated based at least in part on a depth map. Such a prediction unit may correspond to a portion of a video picture that is associated with the depth map.

Processing may continue from operation 202 to operation 204, "PERFORM DISPARITY COMPENSATED INTER-PICTURE PREDICTION", where disparity compensated inter-picture prediction may be performed. For example, disparity compensated inter-picture prediction may be performed on the prediction unit based at least in part on the calibrated disparity vectors.

Processing may continue from operation 204 to operation 206, "CODE A PREDICTED RESIDUAL OF THE PREDICTION UNIT", where a predicted residual of a prediction unit may be coded. For example, the prediction unit may be coded based at least in part on the disparity compensated inter-picture prediction. In some examples, the coding of the prediction unit includes 3D decoding. In another example, decoding of a dependent view video picture may be based at least in part on the coded prediction unit.

Some additional and/or alternative details related to process 200 may be illustrated in one or more examples of implementations discussed in greater detail below with regard to FIG. 3.

Figure 3:
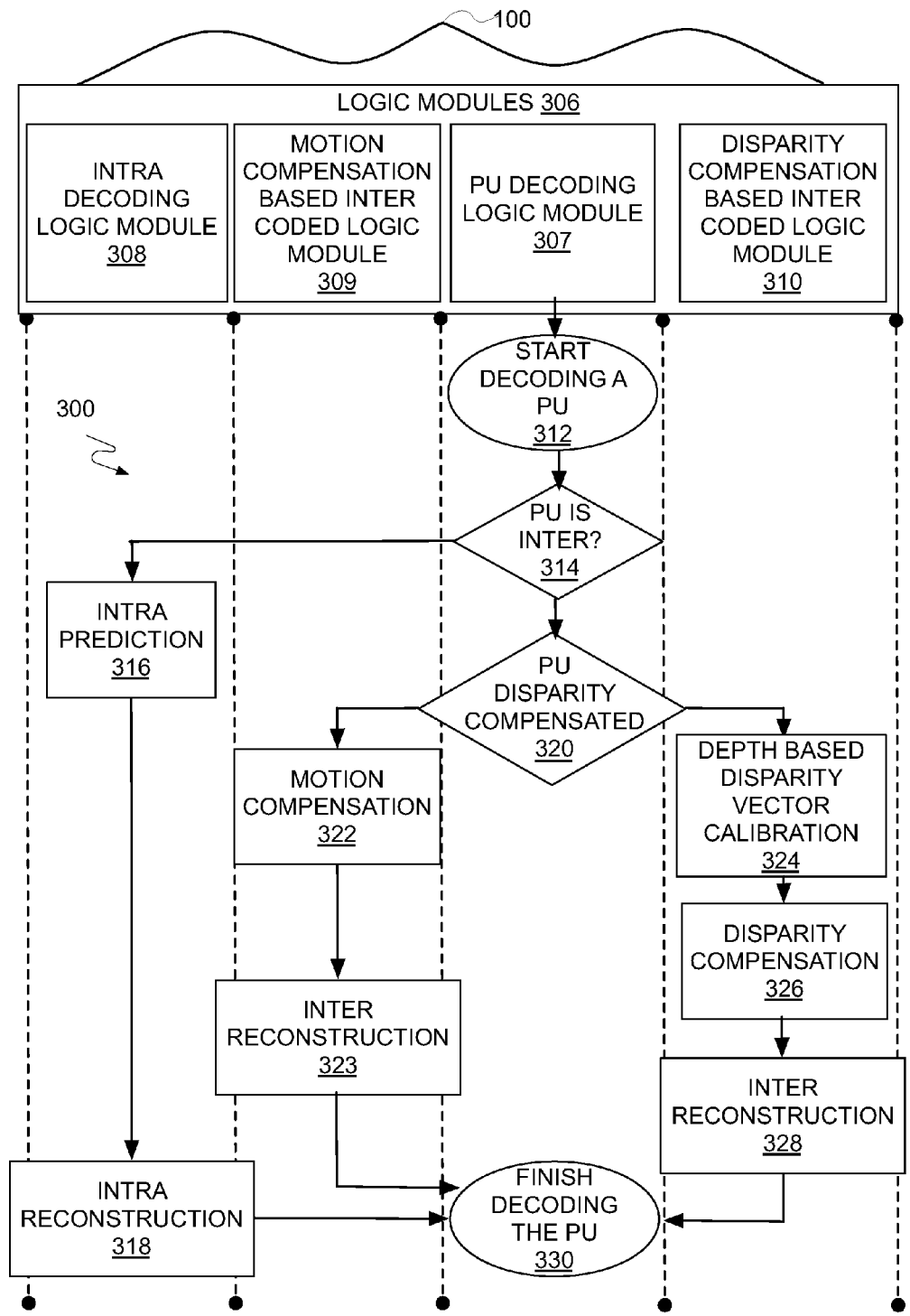
FIG. 3 is an illustrative diagram of an example 3D video coding process in operation.

FIG. 3 is an illustrative diagram of example 3D video coding system 100 and 3D video coding process 300 in operation, arranged in accordance with at least some implementations of the present disclosure. In the illustrated implementation, process 300 may include one or more operations, functions or actions as illustrated by one or more of actions 312, 314, 316, 318, 320, 322, 323, 324, 326, 328, and/or 330. By way of non-limiting example, process 300 will be described herein with reference to example 3D video coding system 100 of FIGS. 1 and/or 5.

In the illustrated implementation, 3D video coding system 100 may include logic modules 306, the like, and/or combinations thereof. For example, logic modules 306, may include PU decoding logic module 307, intra prediction logic module 308, motion compensation logic module 309, disparity compensation logic module 310, the like, and/or combinations thereof. Although 3D video coding system 100, as shown in FIG. 3, may include one particular set of blocks or actions associated with particular modules, these blocks or actions may be associated with different modules than the particular module illustrated here.

Process 300 may begin at block 312, "START DECODING", where decoding may be started. For example, a prediction unit that corresponds to a portion of a video picture that is associated with the depth map may be decoded. Although process 300, as illustrated, is directed to decoding, the concepts and/or operations described may be applied in the same or similar manner to coding in general, including in encoding.

Processing may continue from operation 312 to operation 314, "PU IS INTER?", where a determination may be made regarding whether the prediction unit is inter-picture predicted or intra-picture predicted. For example, such a determination may be made via PU decoding logic module 307.

In cases where operation 314 determines that the prediction unit is intra-picture predicted, processing may continue from operation 314 to operation 316, "INTRA PREDICTION", where an intra prediction scheme may be implemented. For example, an intra prediction scheme may be made via intra prediction logic module 308.

Processing may continue from operation 316 to operation 318. "INTRA RECONSTRUCTION", where an intra prediction unit will may be reconstructed. For example, the intra prediction unit may be reconstructed based at least in part on the output of the intra prediction scheme via intra prediction logic module 308.

In cases where operation 314 determines that the prediction unit is inter-picture predicted, processing may continue from operation 314 to operation 320, "PU DISPARITY COMPENSATED", where a determination may be made, via PU decoding logic module 307, regarding whether the prediction unit should be motion compensated or disparity compensated.

In cases where operation 320 determines that the prediction unit should not be disparity compensated, processing may continue from operation 320 to operation 322, "MOTION COMPENATION", where motion compensated inter-picture prediction may be performed, and operation 323, "INTER RECONSTRUCTION". For example, motion compensated inter-picture prediction may be performed on the prediction unit based at least in part on coded pictures of the same view via motion compensation logic module 309.

In cases where operation 320 determines that the prediction unit should be disparity compensated, processing may continue from operation 320 to operation 324, "DEPTH BASED DISPARITY VECTOR CALIBRATION", where two or more disparity vectors may be calibrated. For example, two or more disparity vectors associated with a prediction unit may be calibrated based at least in part on a depth map via disparity compensation logic module 310 (or via a separate calibration logic module (not shown)). Such a prediction unit may correspond to a portion of a video picture that is associated with the depth map.

Processing may continue from operation 324 to operation 326, "DISPARITY COMPENSATION", where disparity compensated inter-picture prediction may be performed, and operation 328, "INTER RECONSTRUCTION". For example, disparity compensated inter-picture prediction may be performed on the prediction unit based at least in part on the calibrated disparity vectors. For example, disparity compensated inter-picture prediction may be performed on the prediction unit based at least in part on coded pictures of other views via disparity compensation logic module 310.

Processing may continue from operations 318, 323, and/or 328 to operation 330, "FINISH DECODING THE PU", where the prediction unit may be coded. For example, the prediction unit may be coded based at least in part on the disparity compensated inter-picture prediction. In some examples, the coding of the prediction unit includes 3D decoding. In another example, decoding of a dependent view video picture may be based at least in part on the coded prediction unit via PU decoding logic module 307.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
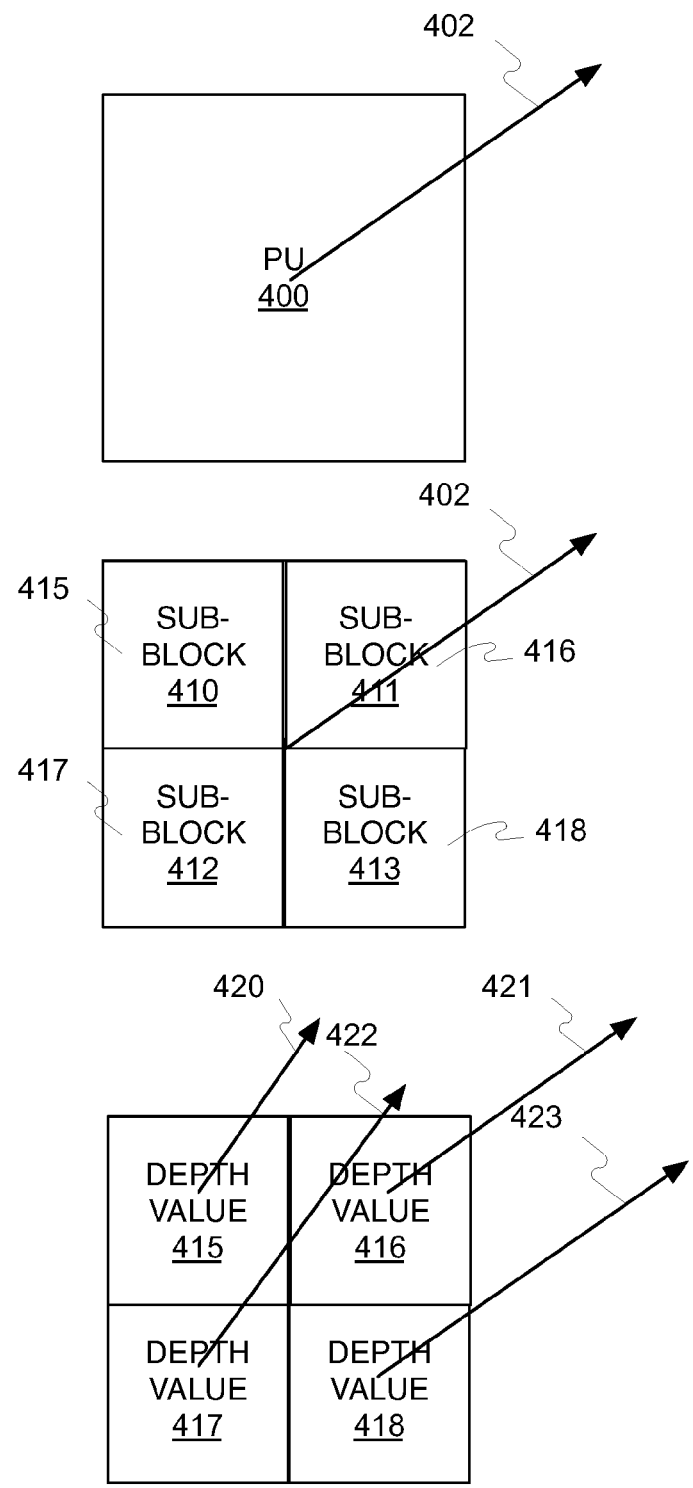
FIG. 4 is an illustrative diagram of example disparity vector calibrations.

FIG. 4 is an illustrative diagram of example disparity vector calibrations in accordance with at least some implementations of the present disclosure. In the illustrated implementation, a prediction unit 400 associated with a primary disparity vector 402 may be partitioned into two or more sub-blocks (e.g., sub-blocks 410, 411, 412, and 413) prior to the calibration of the two or more disparity vectors (e.g., disparity vectors 420, 421, 422, and 423). As used herein, the term "primary disparity vector" may refer to the original disparity vector associated with current prediction unit 400 prior to disparity vector calibration.

In some examples, the partitioning of prediction unit 400 into two or more sub-blocks is parameterized so that the finest partition available is equal to a per pixel level partition. For example, each of the two or more sub-blocks 410, 411, 412, and 413 may be as small as a single pixel.

In some implementations, a differentiation may be made between a first type of prediction unit and a second type of prediction unit different from the first type, where the first and second type of prediction units differ base on one or more of the following criteria: a slice-level criterion, a picture level criterion, a view level criterion, the like, and/or combinations thereof. Such a slice-level criterion might be utilized to differentiate between a first and second type of prediction unit based at least in part on variation among different slices (e.g. different portions of the current video picture being coded). Such a picture level criterion might be utilized to differentiate between a first and second type of prediction unit based at least in part on variation among different pictures (e.g., differences among two or more video pictures, such as between the current video picture being coded and a reference video picture). Such view level criterion might be utilized to differentiate between a first and second type of prediction unit based at least in part on variation among different views (e.g., differences among two or more views associated with different video pictures, such as between a view associated with the current video picture being coded and a view associated with a reference video picture). For example, a slice-level criterion, a picture level criterion, and/or a view level criterion, might be utilized to indicate a differentiation between a relatively homogenous depth in a first type of prediction unit and a relatively heterogeneous depth a second type of prediction unit. For example, a first parameter value might be set so that the homogenous depth prediction unit is not partitioned at all, while a second parameter value might be set so that the heterogeneous depth prediction unit is partitioned into multiple parts.

In some examples, prediction unit 400 may be selectively partitioned with a first parameter value for the first type of prediction unit and prediction unit 400 may be selectively partitioned with a second parameter value different from the first parameter value for the second type of prediction unit. For example, a first parameter value might be set so that the first type of prediction unit is not partitioned at all, while a second parameter value might be set so that the second type of prediction unit is partitioned into multiple parts.

In another example, a differentiation may be made between a first type of prediction unit and a second type of prediction unit different from the first type based at least in part on a size of prediction unit 400. For example, a first parameter value might be set so that the first type of prediction unit is finely partitioned for a large prediction unit 400, while a second parameter value might be set so that the second type of prediction unit is coarsely partitioned for a relatively small prediction unit 400.

In a further example, prediction unit 400 may be partitioned into two or more sub-blocks 410, 411, 412, and 413 prior to the calibration of the two or more disparity vectors 420, 421, 422, and 423. The calibration of the two or more disparity vectors 420, 421, 422, and 423 may include calibrating individual vectors of the two or more disparity vectors 420, 421, 422, and 423 for individual sub-blocks of the two or more sub-blocks 410, 411, 412, and 413 based at least in part on a characteristic depth value 415, 416, 417, and 418 selected from the following characteristic depth values: an average depth value associated with the individual sub-block, a depth value corresponding to a center pixel associated with the individual sub-block, a median depth value corresponding to the individual sub-block, the like, and/or combinations thereof.

In a still further example, the calibration of the two or more disparity vectors 420, 421, 422, and 423 may include calibrating, via a decoder, individual vectors of the two or more disparity vectors 420, 421, 422, and 423 for individual sub-blocks of the two or more sub-blocks 410, 411, 412, and 413 based at least in part on a fixed depth model, a scaling factor, an offset factor, the like, and/or combinations thereof. For example, the scaling factor or offset factor may be equal to fixed value, which may be defined in the standard and will not change during encoding and decoding.

In some examples, the calibration of the two or more disparity vectors 420, 421, 422, and 423 may include determining, via a decoder, a scaling factor for individual sub-blocks of the two or more sub-blocks 410, 411, 412, and 413 based at least in part on a characteristic depth value 415, 416, 417, and 418 associated with the individual sub-block. An offset factor may be determined, via the decoder, for individual sub-blocks of the two or more sub-blocks 410, 411, 412, and 413 based at least in part on a characteristic depth value 415, 416, 417, and 418 associated with the individual sub-block. Individual vectors of the two or more disparity vectors 420, 421, 422, and 423 may be calibrated, via the decoder, for individual sub-blocks of the two or more sub-blocks 410, 411, 412, and 413 based at least in part on the scaling factor and the offset factor.

In another example, the calibration of the two or more disparity vectors 420, 421, 422, and 423 may include receiving, via a decoder, a scaling factor for individual sub-blocks of the two or more sub-blocks 410, 411, 412, and 413 from an encoder, the scaling factor having been previously determined by an encoder based at least in part on a characteristic depth value 415, 416, 417, and 418 associated with the individual sub-block. An offset factor for individual sub-blocks of the two or more sub-blocks 410, 411, 412, and 413 may be received from the encoder via the decoder, the scaling factor having been previously determined by the encoder based at least in part on a characteristic depth value 415, 416, 417, and 418 associated with the individual sub-block. Individual vectors of the two or more disparity vectors 420, 421, 422, and 423 for individual sub-blocks of the two or more sub-blocks 410, 411, 412, and 413 may be calibrated, via the decoder, based at least in part on the scaling factor and the offset factor.

In some examples, the scaling factor and the offset factor may be determined based at least in part on imaging device parameters. For example, a camera-parameter-derived depth model may be applied to the disparity vector calibration. For example, the scaling factor and offset factor related to different depth values may be derived, by using the camera parameters (e.g., imaging device position data and/or orientation data) associated with a current video picture being coded.

In a further example, the calibration of the two or more disparity vectors 420, 421, 422, and 423 may include selectively calibrating the two or more disparity vectors 420, 421, 422, and 423 associated with a primary type of prediction unit and calibrating only a single disparity vector associated with a secondary type of prediction unit different from the primary type, where the primary and secondary types of prediction units differ based on one or more of the following criteria: a slice-level criterion, a picture level criterion, a view level criterion, the like, and/or combinations thereof.

In a still further example, a differentiation may be made between a primary type of prediction unit and a secondary type of prediction unit different from the primary type based at least in part on a flag associated with prediction unit 400. The calibration of the two or more disparity vectors 420, 421, 422, and 423 may include selectively calibrating the two or more disparity vectors 420, 421, 422, and 423 associated with the primary type of prediction unit and calibrating only a single disparity vector associated with the secondary type of prediction unit different from the first type.

As will be described in greater detail below, the depth based disparity vector calibration mainly utilizes three steps. First, the prediction unit 400 block may be divided into the two or more sub-blocks 410, 411, 412, and 413. Second, for individual sub-blocks 410, 411, 412, and 413, a characteristic depth value 415, 416, 417, and 418 may be derived. Third, individual sub-blocks 410, 411, 412, and 413, a calibrated disparity vector 420, 421, 422, and 423 may be derived by using a depth based model. The calibration of the two or more disparity vectors 420, 421, 422, and 423 may include determining a scaling factor for individual sub-blocks of the two or more sub-blocks 410, 411, 412, and 413 based at least in part on a characteristic depth value 415, 416, 417, and 418 associated with the individual sub-block. An offset factor may be determined for individual sub-blocks of the two or more sub-blocks 410, 411, 412, and 413 based at least in pan on a characteristic depth value 415, 416, 417, and 418 associated with the individual sub-block.

First, the prediction unit 400 block may be divided into the two or more sub-blocks 410, 411, 412, and 413. For example, assume current disparity-compensated prediction unit 400 is with size N.times.M. At first, current disparity-compensated prediction unit 400 may be partitioned into several non-overlapped sub-blocks 410, 411, 412, and 413 with size of K.times.L, where the K and L may be controlled by a parameter called dv_calibrate_granularity, as illustrated in equation (1) below.

$$K=N/dv\_calibrate\_granularity; L=M/dv\_calibrate\_granularity \qquad (1)$$

For example, if the size of prediction unit 400 is 16×16 and parameter dv_calibrate_granularity is equal to 2, this prediction unit 4000 may be divided into four sub-blocks with size equal to 8×8.

Second, for individual sub-blocks 410, 411, 412, and 413, a characteristic depth value 415, 416, 417, and 418 may be derived. For example, for each sub-block 410, 411, 412, and 413 with size equal to K×L, its corresponding depth block with size equal to K'×L' can be found from the depth map picture. A characteristic depth value 415, 416, 417, and 418 may be derived out for each sub-block block 410, 411, 412, and 413, which may be the input parameter for the depth based disparity vector calibration model in the next step. For example, assume the characteristic depth value 415, 416, 417, and 418 of ith sub-block is denoted as depthi.

A variety of methods can be used to derive characteristic depth value 415, 416, 417, and 418, for example, average value of the K'×L' depth block, median value of the K'×L' depth block, and etc. Besides, when the depth map data for current picture is not available, the estimated depth data can also be utilized to deduce characteristic depth value.

Third, individual sub-blocks 410, 411, 412, and 413, a calibrated disparity vector 420, 421, 422, and 423 may be derived by using a depth based model. For example, assume the primary disparity vector 402 of current prediction unit 400 is equal to $(dv_x, dv_y)$, where the $dv_x$ and $dv_y$ are the horizontal component and vertical component, respectively. The disparity vector 420, 421, 422, and 423 may be calibrated as equation (2) shows below.

$$(dv_{xi}, dv_{yi}) = DVCalibrate(dv_x, dv_y, depth_i) \qquad (2)$$

where the DVCalibrate(•) indicates the disparity vector calibration function, and $(dv_{xi}, dv_{yi})$ indicate the output disparity vector value for ith sub-block.

Finally, all the sub-blocks 410, 411, 412, and 413 in current prediction unit 400 may be compensated by using their corresponding calibrated disparity vectors 420, 421, 422, and 423, instead of using the same primary disparity vector 402 for all pixels in the prediction unit 400. FIG. 4 shows an example of the calibration of disparity vector, in which a prediction unit 400 is partitioned into four sub-blocks to perform the disparity vector calibration. For example, assume the characteristic depth value 415, 416, 417, and 418 of ith sub-block is denoted as depthi (e.g., corresponding to depth0, depth1, depth2, and depth3). For example, the depth based disparity vector calibration logic module, which is denoted as DVCalibrate( ) above, can be presented by equations (3) and (4) below.

$$dv_{xi}=S_x(depth_i) \times dv_x + O_x(depth_i); dv_{yi}=S_y(depth_i) \times dv_y + O_y(depth) \qquad (3)$$

where the Sx(•) and Sy(•) indicate the scaling factors for the disparity vector value, and Ox(•) and Oy(•) indicate the offset factors for the disparity vector value. For example, if one fixes the Sx(depth$_i$) and Sy(depth$_i$) equal to 1, and $$O_x(depth_i)=O_y(depth_i)=\{1, \text{ if } depth_i \le TH; -1, \text{ if } depth_i > TH\} \qquad (4)$$

Then, it means if the characteristic depth value of current sub-block is less or equal to a threshold TH, the disparity vector value may be increased by 1; if the characteristic depth value of current sub-block is larger than TH, the disparity vector value may be decreased by 1.

Various methods can be used to design the specific implementation of Sx(•), Sy(•), Ox(•), and/or Oy(•). For example, fixed value (e.g., a fixed depth model) can be used both in encoder and decoder, or the function and value may be deduced by encoder and transmitted to decoder by bitstream, or the function and value can be self-derived at the decoder by using the previous coded information, the like, and/or combinations thereof.

Figure 5:
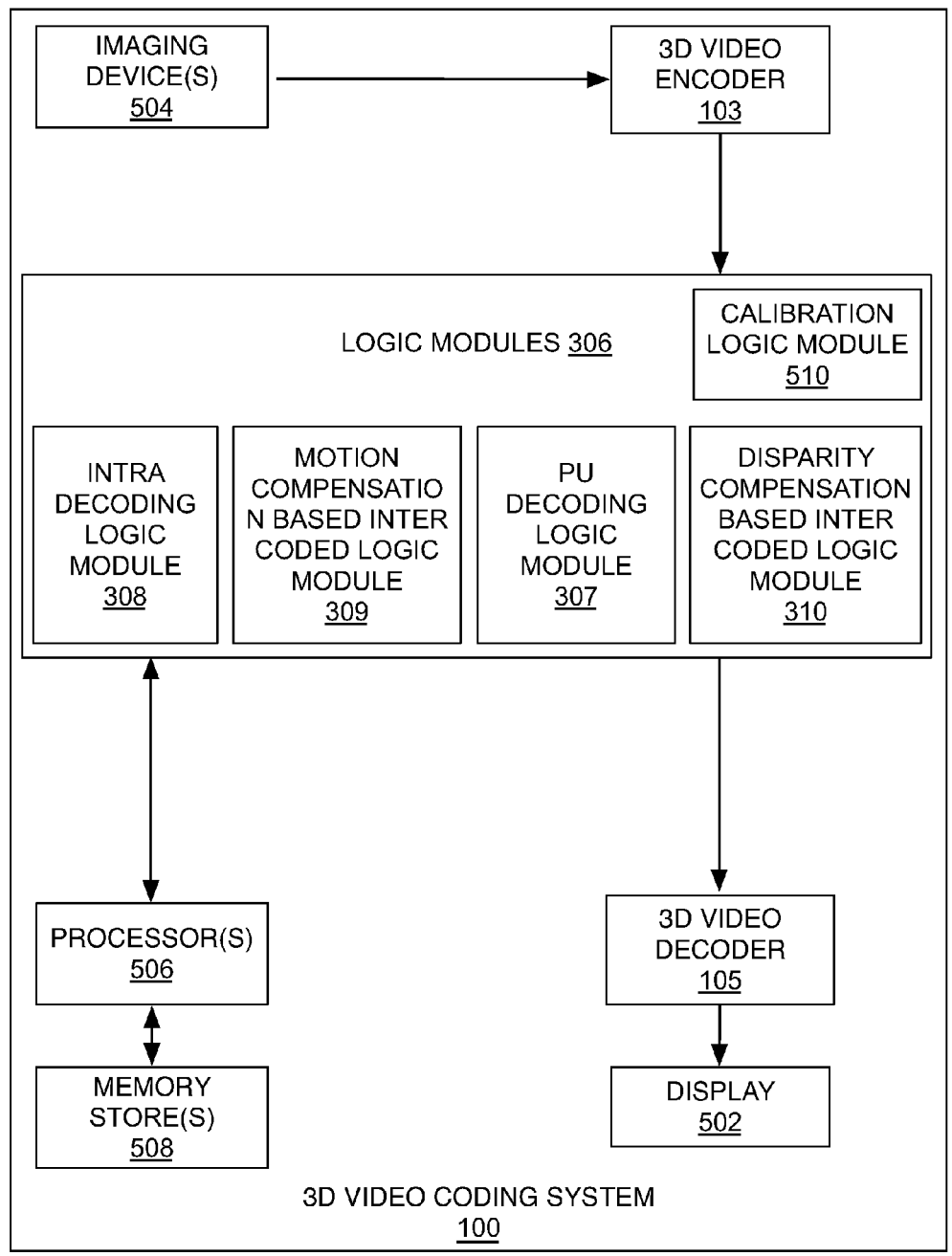
FIG. 5 is an illustrative diagram of an example 3D video coding system.

FIG. 5 is an illustrative diagram of an example 3D video coding system 100, arranged in accordance with at least some implementations of the present disclosure. In the illustrated implementation, 3D video coding system 100 may include display 502, imaging device(s) 504, 3D video encoder 103, 3D video decoder 105, and/or logic modules 306. Logic modules 306 may include PU decoding logic module 307, intra prediction logic module 308, motion compensation logic module 309, disparity compensation logic module 310, a calibration logic module 510, the like, and/or combinations thereof.

As illustrated, display 502, 3D video decoder 105, processor 506 and/or memory store 508 may be capable of communication with one another and/or communication with portions of logic modules 306. Similarly, imaging device(s) 504 and 3D video encoder 103 may be capable of communication with one another and/or communication with portions of logic modules 306. Accordingly, 3D video decoder 105 may include all or portions of logic modules 306, while 3D video encoder 103 may include similar logic modules. Although 3D video coding system 100, as shown in FIG. 5, may include one particular set of blocks or actions associated with particular modules, these blocks or actions may be associated with different modules than the particular module illustrated here.

In some examples, display device 502 may be configured to present video data. Processors 506 may be communicatively coupled to display device 502. Memory stores 508 may be communicatively coupled to processors 506. Calibration logic module 510 may be communicatively coupled to processors 506 and may be configured to calibrate two or more disparity vectors associated with a prediction unit based at least in part on a depth map. The prediction unit may correspond to a portion of a video picture that is associated with the depth map. Disparity compensation logic module 310 may be communicatively coupled to calibration logic module 510 and may be configured to perform disparity compensated inter-picture prediction on the prediction unit based at least in part on the calibrated disparity vectors. Coder (e.g., 3D video decoder 105 or 3D video encoder 103) may be communicatively coupled to disparity compensation logic module 310 and may be configured to code the prediction unit based at least in part on the disparity compensated inter-picture prediction for presentation on display device.

In various embodiments, calibration logic module 510) and/or disparity compensation logic module 310 may be implemented in hardware, while software may implement PU decoding logic module 307, intra prediction logic module 308, and/or motion compensation logic module 309. For example, in some embodiments, calibration logic module 511 and/or disparity compensation logic module 310 may be implemented by application-specific integrated circuit (ASIC) logic while PU decoding logic module 307, intra prediction logic module 308, and/or motion compensation logic module 309 may be provided by software instructions executed by logic such as processors 506. However, the present disclosure is not limited in this regard and PU decoding logic module 307, intra prediction logic module 308, motion compensation logic module 309, calibration logic module 510, and/or disparity compensation logic module 310 may be implemented by any combination of hardware, firmware and/or software. In addition, memory stores 508 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 508 may be implemented by cache memory.

Figure 6:
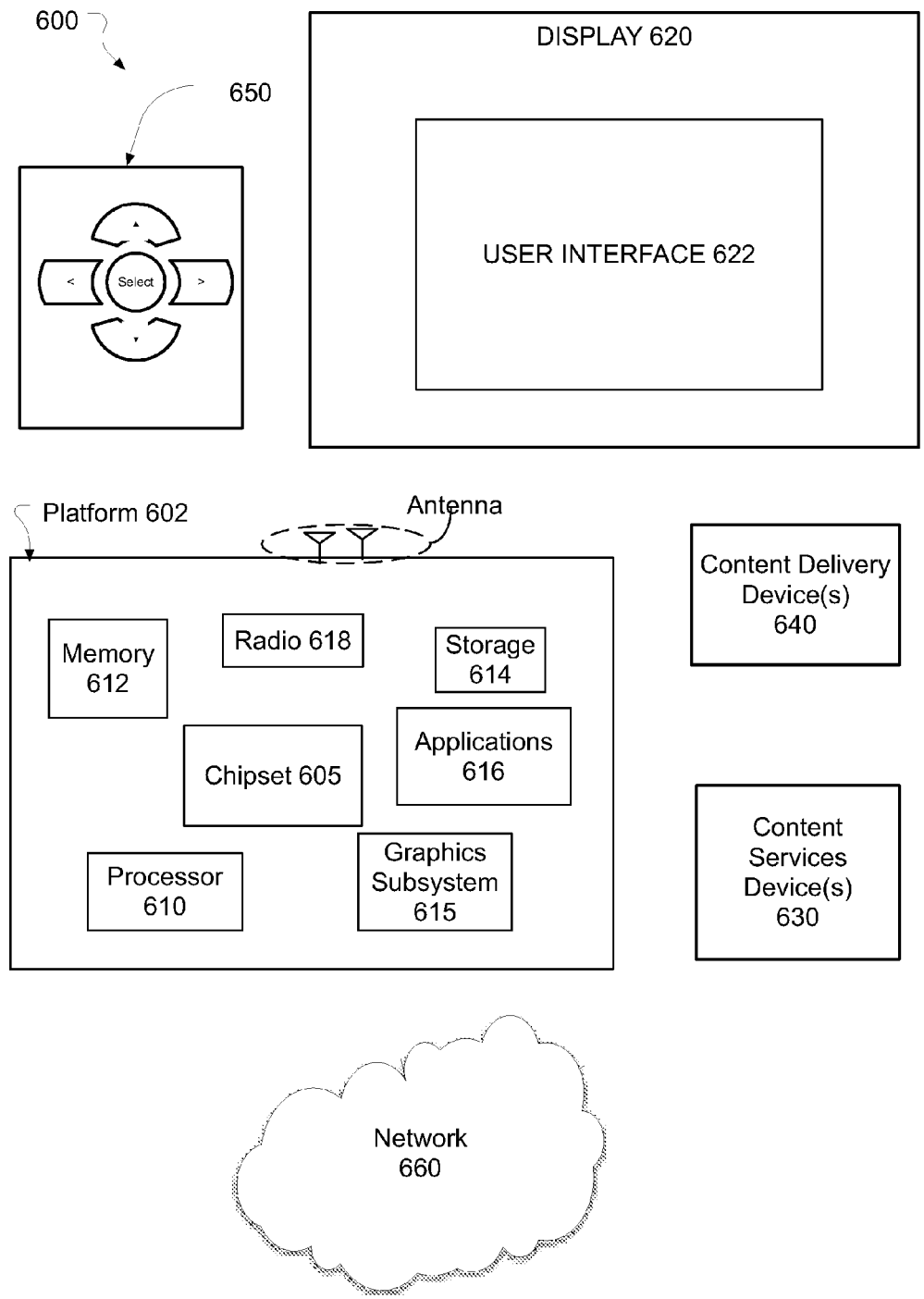
FIG. 6 is an illustrative diagram of an example system.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) (40 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 6.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600) may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

The embodiments, however, are not limited to the elements or in the context shown or described in FIG. 6.

Figure 7:
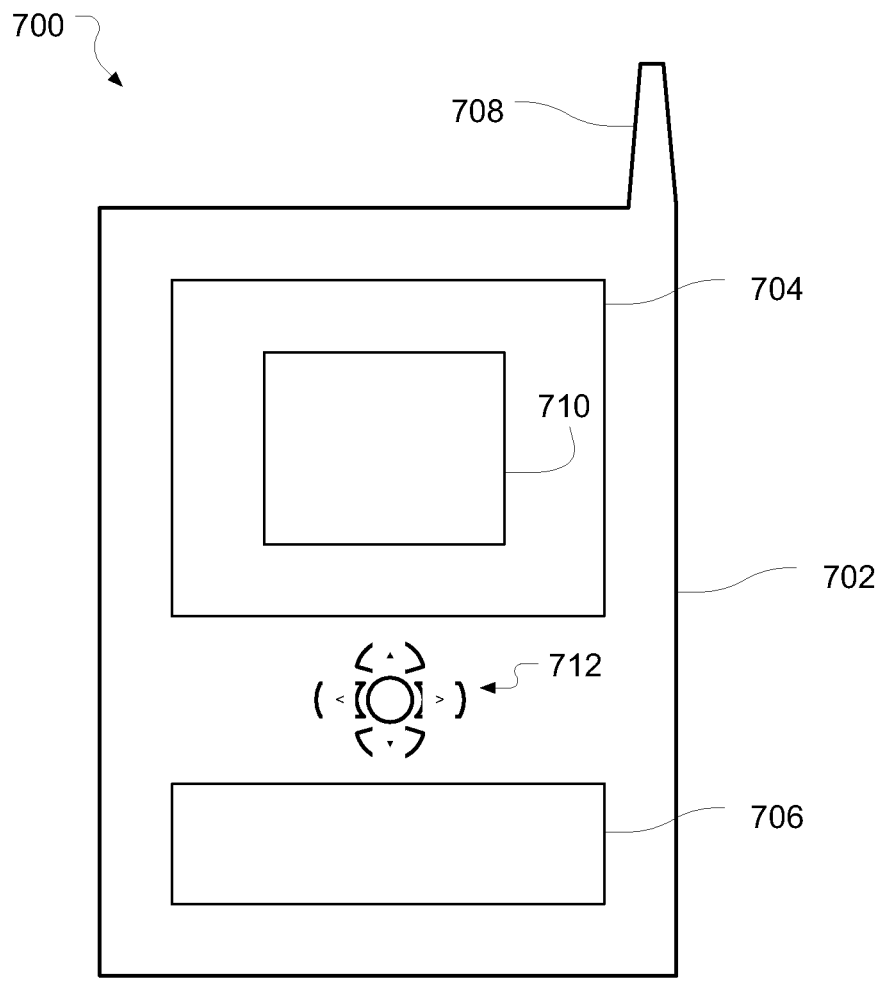
FIG. 7 is an illustrative diagram of an example system, all arranged in accordance with at least some implementations of the present disclosure.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include calibrating two or more disparity vectors associated with a prediction unit based at least in part on a depth map, where the prediction unit corresponds to a portion of a video picture that is associated with the depth map. Disparity compensated inter-picture prediction may be performed on the prediction unit based at least in part on the calibrated disparity vectors. The prediction unit may be coded based at least in part on the disparity compensated inter-picture prediction.

In some examples, the coding of the prediction unit includes 3D decoding.

In another example, decoding of a dependent view video picture may be based at least in part on the coded prediction unit.

In a further example, the prediction unit may be partitioned into two or more sub-blocks prior to the calibration of the two or more disparity vectors.

In a still further example, the prediction unit may be partitioned into two or more sub-blocks prior to the calibration of the two or more disparity vectors, where the partitioning of the prediction unit into two or more sub-blocks is parameterized so that the finest partition available is equal to a per pixel level partition.

In some examples, a differentiation may be made between a first type of prediction unit and a second type of prediction unit different from the first type, where the first and second type of prediction units differ base on one or more of the following criteria: a slice-level criterion, a picture level criterion, and a view level criterion. The prediction unit may be selectively partitioned with a first parameter value for the first type of prediction unit and the prediction unit may be selectively partitioned with a second parameter value different from the first parameter value for the second type of prediction unit.

In another example, a differentiation may be made between a first type of prediction unit and a second type of prediction unit different from the first type based at least in part on a size of the prediction unit. The prediction unit may be selectively partitioned with a first parameter value for the first type of prediction unit and the prediction unit may be selectively partitioned with a second parameter value different from the first parameter value for the second type of prediction unit.

In a further example, the prediction unit may be partitioned into two or more sub-blocks prior to the calibration of the two or more disparity vectors. The calibration of the two or more disparity vectors may include calibrating individual vectors of the two or more disparity vectors for individual sub-blocks of the two or more sub-blocks based at least in part on a characteristic depth value selected from the following characteristic depth values: an average depth value associated with the individual sub-block, a depth value corresponding to a center pixel associated with the individual sub-block, a median depth value corresponding to the individual sub-block, the like, and/or combinations thereof.

In a still further example, the prediction unit may be partitioned into two or more sub-blocks prior to the calibration of the two or more disparity vectors. The calibration of the two or more disparity vectors may include calibrating, via a decoder, individual vectors of the two or more disparity vectors for individual sub-blocks of the two or more sub-blocks based at least in part on a fixed depth model, a scaling factor, an offset factor, the like, and/or combinations thereof.

In some examples, the prediction unit may be partitioned into two or more sub-blocks prior to the calibration of the two or more disparity vectors. The calibration of the two or more disparity vectors may include determining, via a decoder, a scaling factor for individual sub-blocks of the two or more sub-blocks based at least in part on a characteristic depth value associated with the individual sub-block. An offset factor may be determined, via the decoder, for individual sub-blocks of the two or more sub-blocks based at least in part on a characteristic depth value associated with the individual sub-block. Individual vectors of the two or more disparity vectors may be calibrated, via the decoder, for individual sub-blocks of the two or more sub-blocks based at least in part on the scaling factor and the offset factor.

In another example, the prediction unit may be partitioned into two or more sub-blocks prior to the calibration of the two or more disparity vectors. The calibration of the two or more disparity vectors may include receiving, via a decoder, a scaling factor for individual sub-blocks of the two or more sub-blocks from an encoder, the scaling factor having been previously determined by an encoder based at least in part on a characteristic depth value associated with the individual sub-block. An offset factor for individual sub-blocks of the two or more sub-blocks may be received from the encoder via the decoder, the scaling factor having been previously determined by the encoder based at least in part on a characteristic depth value associated with the individual sub-block. Individual vectors of the two or more disparity vectors for individual sub-blocks of the two or more sub-blocks may be calibrated, via the decoder, based at least in part on the scaling factor and the offset factor.

In some examples, the prediction unit may be partitioned into two or more sub-blocks prior to the calibration of the two or more disparity vectors. The calibration of the two or more disparity vectors may include calibrating, via the decoder, individual vectors of the two or more disparity vectors for individual sub-blocks of the two or more sub-blocks based at least in part on a scaling factor and an offset factor. The scaling factor and the offset factor may be determined based at least in part on imaging device parameters.

In a further example, the calibration of the two or more disparity vectors may include selectively calibrating the two or more disparity vectors associated with a primary type of prediction unit and calibrating only a single disparity vector associated with a secondary type of prediction unit different from the primary type, where the primary and secondary types of prediction units differ base on one or more of the following criteria: a slice-level criterion, a picture level criterion, a view level criterion, the like, and/or combinations thereof.

In a still further example, a differentiation may be made between a primary type of prediction unit and a secondary type of prediction unit different from the primary type based at least in part on a flag associated with the prediction unit. The calibration of the two or more disparity vectors may include selectively calibrating the two or more disparity vectors associated with the primary type of prediction unit and calibrating only a single disparity vector associated with the secondary type of prediction unit different from the first type.

In other examples, a system for video coding on a computer may include a display device, one or more processors, one or more memory stores, a calibration logic module, a disparity compensation logic module, a coder, the like, and/or combinations thereof. The imaging device may be configured to present video data. The one or more processors may be communicatively coupled to the display device. The one or more memory stores may be communicatively coupled to the one or more processors. The calibration logic module may be communicatively coupled to the one or more processors and may be configured to calibrate two or more disparity vectors associated with a prediction unit based at least in part on a depth map. The prediction unit may correspond to a portion of a video picture that is associated with the depth map. The disparity compensation logic module may be communicatively coupled to the calibration logic module and may be configured to perform disparity compensated inter-picture prediction on the prediction unit based at least in part on the calibrated disparity vectors. The coder may be communicatively coupled to the disparity compensation logic module and may be configured to code the prediction unit based at least in part on the disparity compensated inter-picture prediction for presentation on display device.

In a further example, the coder may includes a 3D decoder.

In a still further example, the coder may further be configured to decode a dependent view video picture based at least in part on the coded prediction unit.

In another example, the calibration logic module may be further configured to partition the prediction unit into two or more sub-blocks prior to the calibration of the two or more disparity vectors. The partitioning of the prediction unit into two or more sub-blocks may be parameterized so that the finest partition available is equal to a per pixel level partition. The calibration of the two or more disparity vectors may include calibrating individual vectors of the two or more disparity vectors for individual sub-blocks of the two or more sub-blocks based at least in part on a characteristic depth value selected from the following characteristic depth values: an average depth value associated with the individual sub-block, a depth value corresponding to a center pixel associated with the individual sub-block, a median depth value corresponding to the individual sub-block, the like, and/or combinations thereof.

In some examples, the calibration logic module may be further configured to differentiate between a first type of prediction unit and a second type of prediction unit different from the first type, where the first and second type of prediction units differ base on one or more of the following criteria: a slice-level criterion, a picture level criterion, a view level criterion, the like, and/or combinations thereof. The prediction unit may be selectively partitioned with a first parameter value for the first type of prediction unit and partitioned with a second parameter value different from the first parameter value for the second type of prediction unit.

In a further example, the calibration logic module may be further configured to differentiate between a first type of prediction unit and a second type of prediction unit different from the first type based at least in part on a size of the prediction unit. The prediction unit may be selectively partitioned with a first parameter value for the first type of prediction unit and partitioned with a second parameter value different from the first parameter value for the second type of prediction unit.

In a still further example, the calibration logic module may be further configured to partition the prediction unit into two or more sub-blocks prior to the calibration of the two or more disparity vectors. The calibration of the two or more disparity vectors may include calibrating, via the coder, individual vectors of the two or more disparity vectors for individual sub-blocks of the two or more sub-blocks based at least in part on a fixed depth model, a scaling factor, an offset factor, the like, and/or combinations thereof.

In another example, the calibration logic module may be further configured to partition the prediction unit into two or more sub-blocks prior to the calibration of the two or more disparity vectors. The calibration of the two or more disparity vectors may include determining, via the coder, a scaling factor for individual sub-blocks of the two or more sub-blocks based at least in part on a characteristic depth value associated with the individual sub-block. An offset factor for individual sub-blocks of the two or more sub-blocks may be determined, via the coder, based at least in part on a characteristic depth value associated with the individual sub-block. Individual vectors of the two or more disparity vectors for individual sub-blocks of the two or more sub-blocks may be calibrated, via the coder, based at least in part on the scaling factor and the offset factor.

In some examples, the calibration logic module may be further configured to partition the prediction unit into two or more sub-blocks prior to the calibration of the two or more disparity vectors. The calibration of the two or more disparity vectors may include receiving, via the coder, a scaling factor for individual sub-blocks of the two or more sub-blocks from an encoder, the scaling factor having been previously determined by the encoder based at least in part on a characteristic depth value associated with the individual sub-block. An offset factor for individual sub-blocks of the two or more sub-blocks may be received from the encoder via the coder, the scaling factor having been previously determined by the encoder based at least in part on a characteristic depth value associated with the individual sub-block. Individual vectors of the two or more disparity vectors for individual sub-blocks of the two or more sub-blocks may be calibrated, via the coder, based at least in part on the scaling factor and the offset factor.

In a further example, the calibration logic module may be further configured to partition the prediction unit into two or more sub-blocks prior to the calibration of the two or more disparity vectors. The calibration of the two or more disparity vectors may include calibrating, via the coder, individual vectors of the two or more disparity vectors for individual sub-blocks of the two or more sub-blocks based at least in part on a scaling factor and an offset factor. The scaling factor and the offset factor may be determined based at least in part on imaging device parameters.

In a still further example, the calibration of the two or more disparity vectors may include selectively calibrating the two or more disparity vectors associated with a primary type of prediction unit and calibrating only a single disparity vector associated with a secondary type of prediction unit different from the primary type, where the primary and secondary types of prediction units differ base on one or more of the following criteria: a slice-level criterion, a picture level criterion, a view level criterion, the like, and/or combinations thereof.

In another example, the calibration logic module may be further configured to differentiate between a primary type of prediction unit and a secondary type of prediction unit different from the primary type based at least in part on a flag associated with the prediction unit. The calibration of the two or more disparity vectors may include selectively calibrating the two or more disparity vectors associated with the primary type of prediction unit and calibrating only a single disparity vector associated with the secondary type of prediction unit different from the first type.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A three dimensional (3D) video decoder apparatus comprising:

circuitry to partition a block of a first picture into two or more sub blocks of the block including a first sub block and a second sub block;

circuitry to access a depth map associated with the block;

circuitry to access a disparity vector associated with the block, wherein the disparity vector provides disparity compensated prediction by referencing an already decoded second picture having a different view with respect to the first picture;

circuitry to selectively determine a calibrated disparity vector for the first sub block based at least in part on the disparity vector associated with the block and the depth map, wherein to selectively determine the calibrated disparity vector, the circuitry determines, using the depth map, a characteristic depth value corresponding to the first sub block, and calibrates the disparity vector associated with the block based on the characteristic depth value to generate the calibrated disparity vector for the first sub block, wherein to calibrate the disparity vector to generate the calibrated disparity vector, the circuitry provides the calibrated disparity vector for the first sub block as a modification of the disparity vector associated with the block based at least in part on a scaling factor and an offset factor, wherein the scaling factor and the offset factor are determined based on the characteristic depth value; and circuitry to perform disparity compensated inter-prediction for the first sub block based on the calibrated disparity vector associated with the first sub block.

2. The apparatus of claim 1, wherein the characteristic depth value is an average depth value of multiple depth values corresponding to the first sub block.

3. The apparatus of claim 1, wherein the characteristic depth value is a median depth value of multiple depth values corresponding to the first sub block.

4. The apparatus of claim 1, wherein the circuitry to selectively determine the calibrated disparity vector for the first sub block based at least in part on the disparity vector associated with the block and the depth map:

provides a disparity vector associated with the first sub block that comprises an increase of the offset of the disparity vector associated with the block in response to the characteristic depth value being less than or equal to a threshold or provides a disparity vector associated with the first sub block that comprises a reduction of the offset of the disparity vector associated with the block in response to the characteristic depth value being greater than the threshold.

5. The apparatus of claim 1, comprising:
circuitry to decode the first sub block based at least in part on the disparity compensated inter-picture prediction.

6. The apparatus of claim 1, wherein one or more of the circuitry comprises any or a combination of hardware or firmware.

7. The apparatus of claim 1, comprising:
circuitry to decode the first sub block based at least in part on the calibrated disparity vector;
a radio communicatively coupled to the circuitry to decode the first sub block; and
at least one antenna communicatively coupled to the radio.

8. The apparatus of claim 7, comprising:
one or more processor circuitry;
at least one memory communicatively coupled to the one or more processor circuitry; and
a display communicatively coupled to the one or more processor circuitry, the display to display a decoded sub block.

9. A computer-implemented method for three dimensional (3D) video decoding, the method comprising:

partitioning a block of a first picture into two or more sub blocks of the block including a first sub block and a second sub block;
accessing a depth map associated with the block;
accessing a disparity vector associated with the block, wherein the disparity vector provides disparity compensated prediction by referencing an already decoded second picture having a different view with respect to the first picture;
selectively determining a calibrated disparity vector for the first sub block based at least in part on the disparity vector associated with the block and the depth map by determining, using the depth map, a characteristic depth value corresponding to the first sub block and calibrating the disparity vector associated with the block based on the characteristic depth value to generate the calibrated disparity vector for the first sub block, wherein calibrating the disparity vector to generate the calibrated disparity vector provides the calibrated disparity vector for the first sub block as a modification of the disparity vector associated with the block based at least in part on a scaling factor and an offset factor, wherein the scaling factor and the offset factor are determined based on the characteristic depth value; and performing disparity compensated inter-prediction for the first sub block based on the calibrated disparity vector associated with the first sub block.

10. The method of claim 9, wherein the characteristic depth value is an average depth value of multiple depth values corresponding to the first sub block.

11. The method of claim 9, wherein the characteristic depth value is a median depth value of multiple depth values corresponding to the first sub block.

12. The method of claim 9, wherein selectively determining the calibrated disparity vector for the first sub block based at least in part on the disparity vector associated with the block and the depth map comprises:

providing a disparity vector associated with the first sub block that comprises an increase of the offset of the disparity vector associated with the block in response to the characteristic depth value being less than or equal to a threshold or providing a disparity vector associated with the first sub block that comprises a reduction of the offset of the disparity vector associated with the block in response to the characteristic depth value being greater than the threshold.

13. The method of claim 9, comprising:
decoding the first sub block based at least in part on the disparity compensated inter-picture prediction.

14. The method of claim 9, comprising:
decoding the first sub block based at least in part on the calibrated disparity vector.

15. At least one non-transitory computer-readable medium comprising instructions stored thereon, which when executed by a computer, cause the computer to:

partition a block of a first picture into two or more sub blocks of the block including a first sub block and a second sub block;
access a depth map associated with the block;
access a disparity vector associated with the block, wherein the disparity vector provides disparity compensated prediction by referencing an already decoded second picture having a different view with respect to the first picture;
selectively determine a calibrated disparity vector for the first sub block based at least in part on the disparity vector associated with the block and the depth map, wherein to selectively determine the calibrated disparity vector, the computer determines, using the depth map, a characteristic depth value corresponding to the first sub block and calibrates the disparity vector associated with the block based on the characteristic depth value to generate the calibrated disparity vector for the first sub block, wherein to calibrate the disparity vector to generate the calibrated disparity vector, the computer provides the calibrated disparity vector for the first sub block as a modification of the disparity vector associated with the block based at least in part on a scaling factor and an offset factor, wherein the scaling factor and the offset factor are determined based on the characteristic depth value; and perform disparity compensated inter-prediction for the first sub block based on the calibrated disparity vector associated with the first sub block.

16. The medium of claim 15, wherein the characteristic depth value is an average depth value of multiple depth values corresponding to the first sub block.

17. The medium of claim 15, wherein the characteristic depth value is a median depth value of multiple depth values corresponding to the first sub block.

18. The medium of claim 15, wherein to selectively determine the calibrated disparity vector for the first sub block based at least in part on the disparity vector associated with the block and the depth map, the computer:
   provides a disparity vector associated with the first sub block that comprises an increase of the offset of the disparity vector associated with the block in response to the characteristic depth value being less than or equal to a threshold or provides a disparity vector associated with the first sub block that comprises a reduction of the offset of the disparity vector associated with the block in response to the characteristic depth value being greater than the threshold.

19. The medium of claim 15, further comprising instructions stored thereon, which when executed by a computer, cause the computer to:
   decode the first sub block based at least in part on the disparity compensated inter-picture prediction.

20. The medium of claim 15, further comprising instructions stored thereon, which when executed by a computer, cause the computer to:
   decode the first sub block based at least in part on the calibrated disparity vector; and
   provide the decoded sub block for display.

* * * * *